United States Patent [19]

Hirao et al.

[11] Patent Number: 4,999,707
[45] Date of Patent: Mar. 12, 1991

[54] SYNCHRONIZING SIGNAL SEPARATING CIRCUIT SEPARATING SYNCHRONIZING SIGNAL FROM A COMPOSITE VIDEO SIGNAL

[75] Inventors: Yoshichika Hirao, Osaka; Nobukazu Hosoya, Nara; Takaaki Ishii, Osaka; Tadashi Amino, Hyogo, all of Japan

[73] Assignee: Sanyo Electric Co., Ltd., Osaka, Japan

[21] Appl. No.: 500,981

[22] Filed: Mar. 29, 1990

[30] Foreign Application Priority Data

Mar. 31, 1989 [JP] Japan ................................. 1-83219

[51] Int. Cl.⁵ .............................................. H04N 5/08
[52] U.S. Cl. ..................................... 358/153; 358/155
[58] Field of Search ........................ 358/153, 154, 148

[56] References Cited

U.S. PATENT DOCUMENTS 4,393,405  7/1983  Ikeda ................................. 358/153
4,550,342  10/1985  Buchanan et al. .................. 358/153

FOREIGN PATENT DOCUMENTS

56-80965  7/1981  Japan .
58-60880  4/1983  Japan .
61-198977  9/1986  Japan .
0248675  11/1986  Japan .

Primary Examiner—Victor R. Kostak
Attorney, Agent, or Firm—Armstrong, Nikaido, Marmelstein, Kubovcik & Murray

[57] ABSTRACT

A synchronizing signal separating circuit inverts and amplifies, in an inverter 12, a composite video signal received from a video amplifying circuit 100 through a coupling condenser 1. An output node B of the inverter 12 is connected to an input node A of the inverter 12 through a switch 14 and a bias resistor 10. A bias resistor 11 is connected between the input node A and a ground potential. An output of the inverter 12 is further inverted and amplified by an inverter 13 and outputted as a composite synchronizing signal and also supplied to a control input of the switch 14. As a result, the switch 14 is turned on in a synchronizing signal period, so that the coupling condenser 1 is charged with the output of the inverter 12 and also the electric charges of the coupling condenser 1 are discharged through the bias resistor 11 in other period than the synchronizing signal period. Therefore, irrespective of a APL of an inputted composite video signal, it is possible to maintain a level difference between a top level of the synchronizing signal and a separation level to be constant to correctly perform separation of the synchronization.

14 Claims, 11 Drawing Sheets

SYNCHRONIZING SIGNAL SEPARATING CIRCUIT SEPARATING SYNCHRONIZING SIGNAL FROM A COMPOSITE VIDEO SIGNAL

BACKGROUND OF THE INVENTION

1. Field of the Invention

The present invention generally relates to synchronizing signal separating circuits, and more particularly, to a synchronizing signal separating circuit for separating a synchronizing signal from a composite video signal in a circuit of, for example, a chrominance signal processing system, a deflection system or the like in a video apparatus such as a television (TV) receiver, a video tape recorder (VTR) and a video disc player.

2. Description of the Background Art

Conventionally, in a video apparatus, such as, a TV receiver, a VTR and a video disc player, for use in various operations, a horizontal synchronizing signal and a vertical synchronizing signal are separated from an inputted or reproduced composite video signal and supplied to various circuits, such as a chrominance signal processing circuit and a deflection circuit in the video apparatus.

Figure 1:
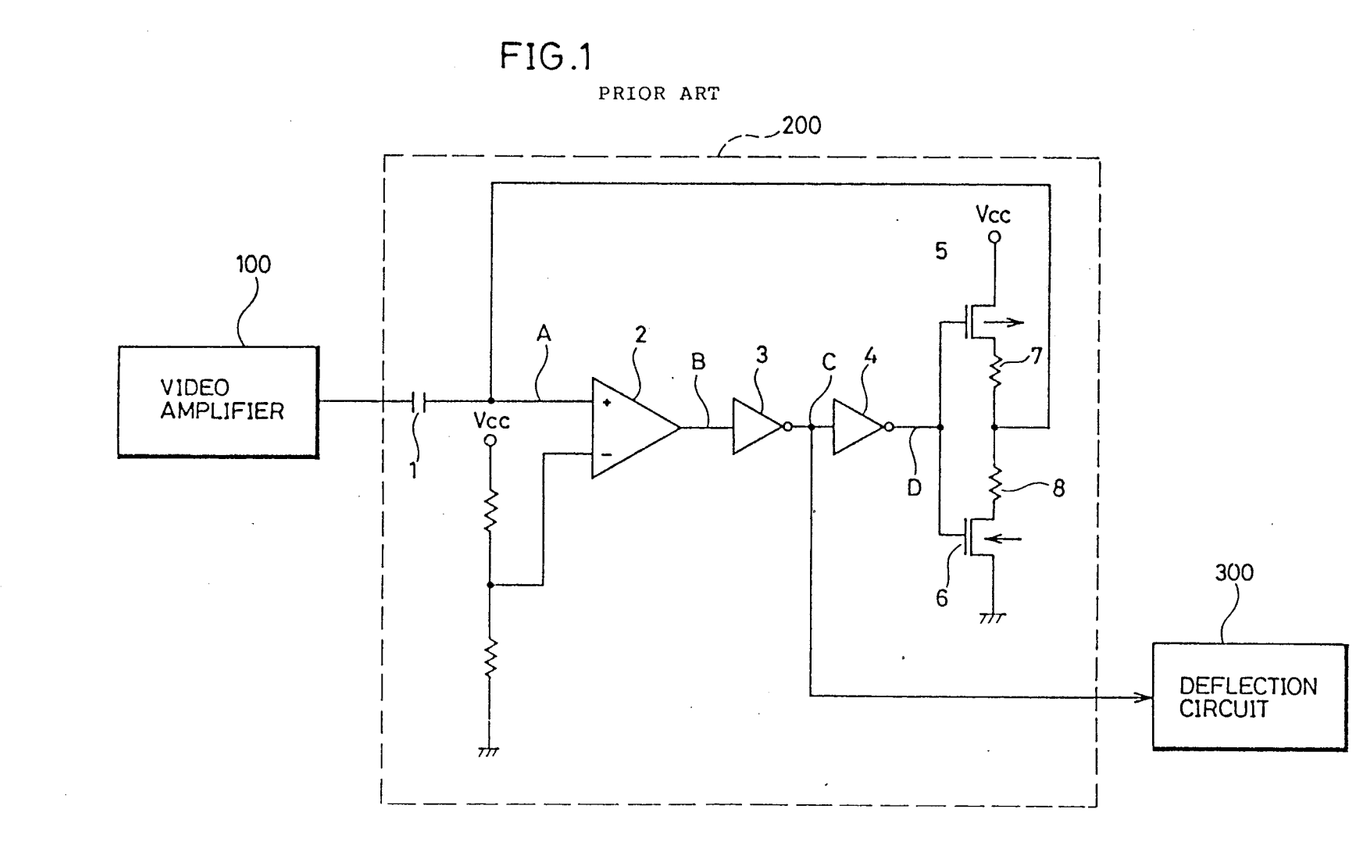
FIG. 1 is a circuit diagram showing one example of a conventional synchronizing signal separating circuit.
Figure 2A:
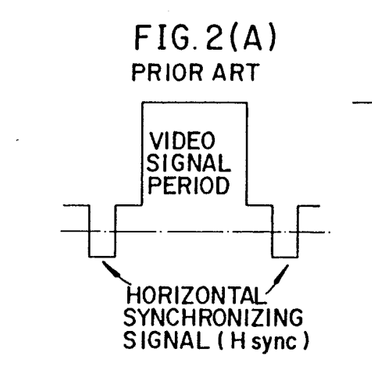
FIGS. 2a–2d and 3a and 3b are timing charts for explaining an operation of the synchronizing signal separating circuit shown in FIG. 1.
Figure 2B:
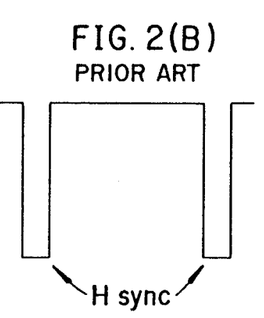
Figure 2C:
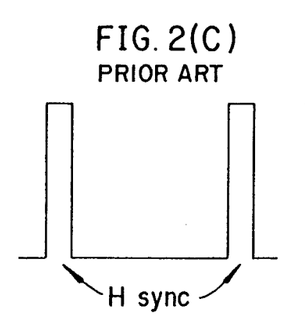
Figure 2D:
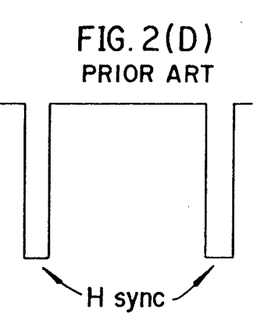

FIG. 1 is a circuit diagram showing one example of such a conventional synchronizing signal separating circuit, in the case where it is applied, for example, to a TV receiver. More specifically, a composite video signal received by an antenna and a video receiving circuit which are not shown is amplified in a video amplifying circuit 100 and then, supplied to a synchronizing signal separating circuit 200. The synchronizing signal separating circuit 200 extracts a horizontal synchronizing signal and a vertical synchronizing signal from the applied composite video signal and outputs the same as a composite synchronizing signal. The composite synchronizing signal outputted from the synchronizing signal separating circuit 200 is supplied, for example, to a deflection circuit 300, wherein the signal is further separated into a horizontal synchronizing signal and a vertical synchronizing signal for use in a deflecting operation.

More particularly with respect to the synchronizing signal separating circuit 200 of FIG. 1, an output of the video amplifying circuit 100 is supplied to a positive input of a comparator 2 through a coupling condenser 1. In addition, a reference voltage of, for example 2.5V is applied to a negative input of the comparator 2. An output of the comparator 2, after being inverted by an inverter 3, is supplied as a composite synchronizing signal to a deflection circuit 300, and also it is further inverted by an inverter 4 and then supplied to gates of a p-channel MOSFET 5 and an n-channel MOSFET 6. These MOSFETs and bias resistors 7 and 8 are connected in series between a power supply potential Vcc and a ground potential, and a node of the resistors 7 and 8 is further connected to the positive input of the comparator 2.

FIG. 2 illustrates a waveform diagram for explaining an operation of the synchronizing signal separating circuit 100 shown in FIG. 1, wherein FIGS. 2 (A), (B), (C) and (D) show signal waveforms approximately in one horizontal period at the corresponding nodes A, B, C and D in the circuit of FIG. 1.

First, when a composite video signal shown in FIG. 2 (A) is applied to the positive input of the comparator 2 through the coupling condenser 1, the comparator 2 compares the composite video signal with the reference potential applied to the negative input (a dashed line of FIG. 2 (A)) and amplifies the result, and outputs a horizontal synchronizing signal of a negative polarity, as shown in FIG. 2 (B), to supply the same to the inverter 3. The horizontal synchronizing signal inverted by the inverter 3 becomes a signal of a positive polarity, as shown in FIG. 2 (C), and is supplied to the deflection circuit 300 in the succeeding stage and also supplied to the inverter 4 wherein it is further inverted. The inverter 4 outputs a horizontal synchronizing signal of the negative polarity, as shown in FIG. 2 (D), and supplies the same to the gates of the p channel MOSFET 5 and n channel MOSFET 6.

As a result, in a horizontal synchronizing signal period of FIG. 2 (D), the p channel MOSFET 5 is turned on and the n channel MOSFET 6 is turned off, so that the coupling condenser 1 is charged with the electric charges from the power supply Vcc through the bias resistor 7, and in the period, except for the horizontal synchronizing signal period, the p channel MOSFET 5 is turned off and the n channel MOSFET 6 is turned on, so that the electric charges stored in the coupling condenser 1 are discharged through the bias resistor 8. A ratio of a length of a horizontal synchronizing signal period to a length of the other period in one horizontal period is defined as about 1:12, and corresponding thereto, a ratio of a resistance value of the bias resistor 7 to that of the bias resistor 8 is set at about 12:1. As a result, the amount of electric charge to be charged in the coupling condenser 1 and that of electric charges to be discharged therefrom become equal, whereby a horizontal synchronizing signal is correctly separated.

The destination of the separated horizontal synchronizing signal (FIG. 2 (C)) is not limited to the deflection circuit 300 shown in FIG. 1, but it can be supplied to any circuit requiring a synchronizing signal, such as, a chrominance signal processing circuit in the video apparatus. In addition, while the inverters 3 and 4 are provided, in the case where a horizontal synchronizing signal to be required is of the positive polarity, and in the case where horizontal synchronizing signal of the negative polarity as shown in FIG. 2 (B) is required, they are not necessary, and it may be constituted so as to supply the output of the comparator 2 as a horizontal synchronizing signal. In addition, while the foregoing description is on the operation in case the horizontal synchronizing signal is separated in a manner as shown in FIG. 2, since a vertical synchronizing signal is comprised of a plurality of pulses each having the above described time ratio of 1:12, it can be separated in the circuit of FIG. 1 similarly to the horizontal synchronizing signal.

With respect to the foregoing, the synchronizing signal separating circuit using MOSFETs is disclosed in, for example, Japanese Patent Laid Open Nos. 56-80965, 58-60880 and 61-198977.

Figure 3A:
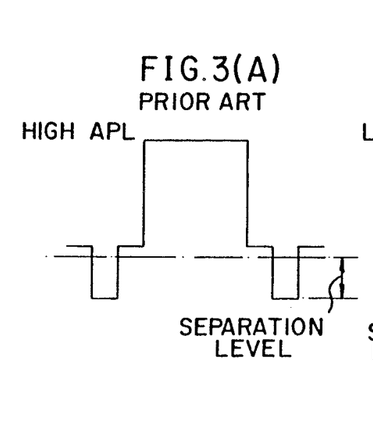
Figure 3B:
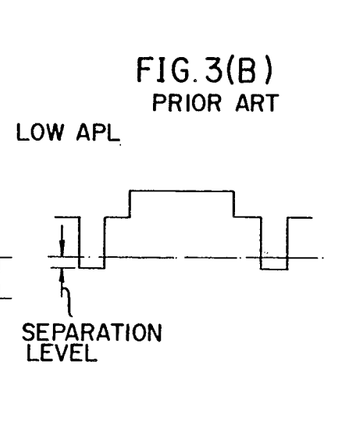

In the conventional synchronizing signal separating circuit shown in FIG. 1, the coupling condenser 1 is charged with a fixed amount of electric charges from the power supply Vcc through the bias resistor 7 in the synchronizing signal period. When there exist a very bright portion and a very dark portion in a picture frame, an average picture level (APL) of a video signal becomes significantly different in each horizontal period in some cases. For example, FIG. 3 (A) indicates that one horizontal line includes a lot of white portions to cause the APL to become high and FIG. (B) indicates that one horizontal line includes a lot of black portions to cause the APL to become low. Accordingly, if the coupling condenser 1 is always charged with a fixed amount of electric charges with respect to video signals in horizontal periods in which the APLs thereof are different, a signal level supplied to the positive input of the comparator 1 falls or rises with respect to a fixed separation level (dashed line of FIG. 3) supplied to the negative input of the comparator 2. As a result, when the separation level becomes contiguous to a lower end or an upper end of a synchronizing signal, noise, a burst signal or the like on the video signal is erroneously detected as a synchronizing signal in some cases and then outputted, so that various processings using a synchronizing signal cannot be normally performed.

SUMMARY OF THE INVENTION

Therefore, an object of the present invention is to provide a synchronizing signal separating circuit capable of correctly separating a synchronizing signal from a composite video signal.

Another object of the present invention is to provide a synchronizing signal separating circuit which does not erroneously detect noise, a burst signal or the like in a composite video signal as a synchronizing signal.

A further object of the present invention is to provide a synchronizing signal separating circuit capable of maintaining a difference in level between a top level of a synchronizing signal and a separation level to be constant, regardless of an APL of an inputted video signal Briefly stated, the present invention is a synchronizing signal separating circuit for separating a synchronizing signal from an inputted signal including at least a synchronizing signal, and the circuit comprises a coupling condenser for receiving an inputted signal, an inverter for inverting and amplifying the input signal received through the coupling condenser, a limiter for limiting an amplitude of an output signal of the inverter to supply the output signal having its amplitude limited as the synchronizing signal, a first bias resistor for connecting an output node to an input node of the inverter to charge the coupling condenser with an output signal of the inverter, a switch provided between the output node of the inverter and the first bias resistor and being controlled so as to be turned on in a synchronizing signal period in response to an output signal of the limiter, and a second bias resistor provided between the input node of the inverter and a ground potential for discharging electric charges of the coupling condenser.

Therefore, a principal advantage of the present invention is that, even if a composite video signal having a different APL is inputted, a level difference between a top level of a synchronizing signal and a separation level does not change, whereby the synchronizing signal can be correctly separated.

The foregoing and other objects, features, aspects and advantages of the present invention will become more apparent from the following more detailed description of the present invention when taken in conjunction with the accompanying drawings.

BRIEF DESCRIPTION OF THE DRAWINGS

FIGS. 11a, 11b, 11$a_2$ and 11$b_2$, 12a and 12b and 13a–13e are timing charts for explaining an operation of the embodiment shown in FIG. 9.

DESCRIPTION OF THE PREFERRED EMBODIMENTS

Figure 4:
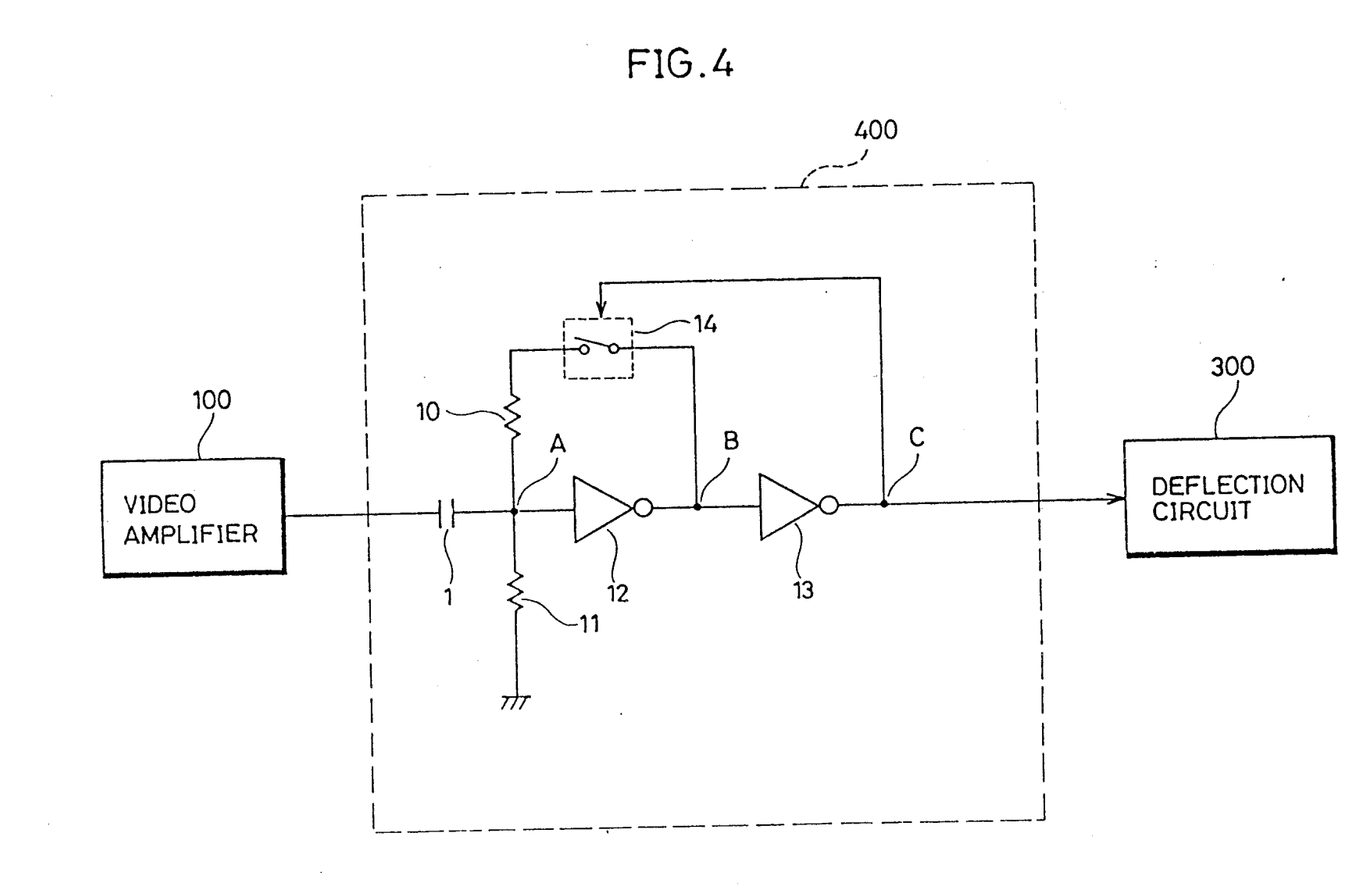
FIG. 4 is a circuit diagram showing a synchronizing signal separating circuit according to a first embodiment of the present invention.

FIG. 4 is the circuit diagram showing the synchronizing signal separating circuit according to the first embodiment of the present invention. Referring now to FIG. 4, an output of a video amplifying circuit 100 is supplied to a synchronizing signal separating circuit 400, wherein it is supplied to an input of an inverter 12 through a coupling condenser 1. An output of the inverter 12 is supplied to an input of an inverter 13 and also supplied to an input node A of the inverter 12 through a switch 14 and a bias resistor 10 connected in series. The input node A is grounded through a bias resistor 11. An output of the inverter 13 is supplied as a composite synchronizing signal to a deflection circuit 300 and also supplied as a control signal to the switch 14 to control the switching of the switch 14.

Figure 5A:
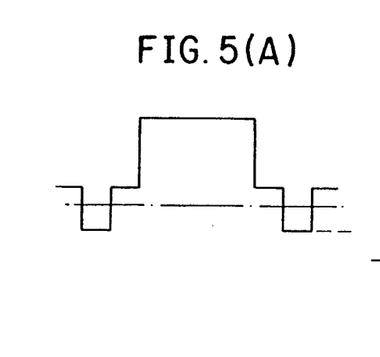
FIGS. 5a–5b and 6 are timing charts for explaining an operation of the embodiment shown in FIG. 4.
Figure 5B:
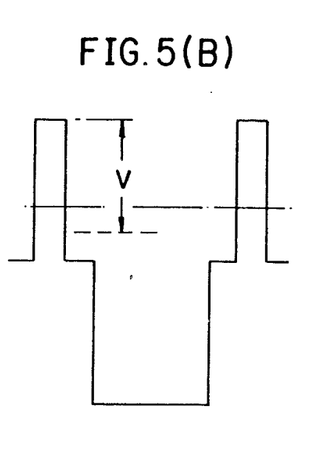
Figure 5C:
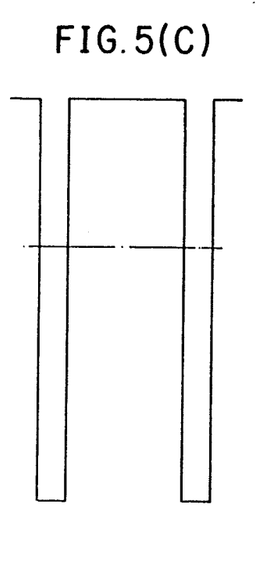

FIG. 5 is the waveform diagram for explaining an operation of the synchronizing signal separating circuit 400 shown in FIG. 4, wherein FIGS. 5 (A), (B) and (C) show signal waveforms in approximately one horizontal period at the corresponding nodes A, B and C in the circuit of FIG. 4, respectively. A dashed line in FIG. 5 indicates a threshold level of the inverters 12 and 13.

First, when the composite video signal shown in FIG. 5 (A) is supplied to the input of the inverter 12 through the coupling condenser 1, the inverter 12 inverts and amplifies the composite video signal to output such a signal, as shown in FIG. 5 (B), and then supplies the signal to the input of the inverter 13 and also to the input node A of the inverter 12 through the switch 14 and the bias resistor 10. The inverter 13 inverts and amplifies the supplied signal to output a horizontal synchronizing signal of a negative polarity, as shown in FIG. 5 (C), and then supplies the same to the deflection circuit 300. In other words, the inverter 13 functions as a limiter. The horizontal synchronizing signal outputted from the inverter 13 is supplied also to the control input of the switch 14.

The switch 14 is constituted so as to be turned on while a control signal is at an "L" level, and turned off while it is at an "H" level. Accordingly, in a horizontal synchronizing signal period (during an "L" level period of FIG. 5 (C), the switch 14 is turned on so that the coupling condenser 1 is charged with the amount of electric charge corresponding to a voltage indicated by V in FIG. 5 (B) through the bias resistor 10. On the other hand, in another period ("H" level period of FIG. 5 (C); i.e.; Other than the horizontal synchronizing signal period, the switch 14 is turned off, so that the electric charge stored in the coupling condenser 1 are discharged through the bias resistor 11.

Figure 6:
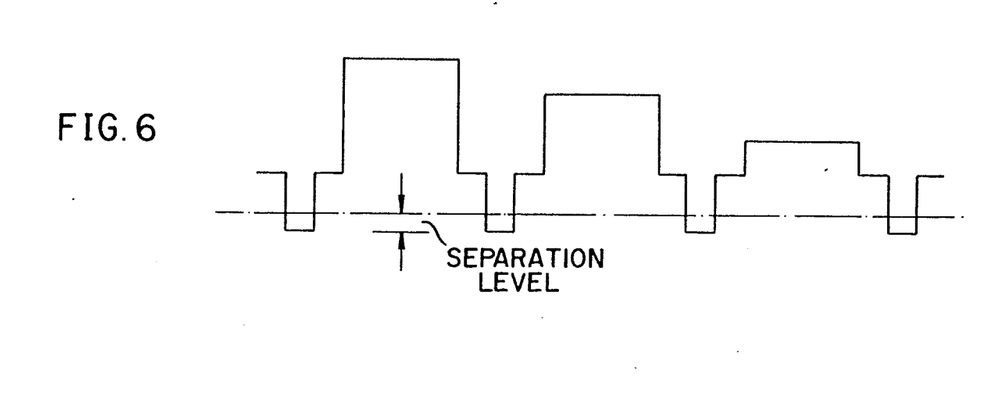

With respect to the foregoing, when the coupling condenser 1 is charged with the amount of electric charge corresponding to the voltage V shown in FIG. 5 (B), and when a composite video signal having an APL fluctuating in each horizontal period as shown in FIG. 6 is inputted, although the inputted signal level fluctuates with respect to the threshold level as described in the foregoing, the voltage V also fluctuates correspondingly. For example, if the separation level becomes contiguous to the lower end of the horizontal synchronizing signal, the voltage V becomes small and the amount of electric charge to be charged decreases so that the separation level is shifted upward. On the contrary, if the separation level becomes contiguous to the upper end of the horizontal synchronizing signal, the voltage V becomes large and the amount of the electric charges to be charged increases so that the separation level is shifted downward. In other words, since a direct current bias at the node A fluctuates in each horizontal period, even if the composite video signal having an APL fluctuating in each period as shown in FIG. 6 is inputted, a level difference between a top level of the horizontal synchronizing signal and a separation level (i.e.) a threshold level of the inverter, is maintained to be constant. As a result, in the synchronizing signal separating circuit of FIG. 4, it is not possible for a separation level to become contiguous to a lower end or an upper end of a synchronizing signal so that no noise or a burst signal is erroneously detected as the synchronizing signal, as is the case with the conventional synchronizing signal separating circuit of FIG. 1.

In the embodiment of the FIG. 4, the larger a ratio of a resistance value of the bias resistor 11 to a resistance value of the bias resistor 10 becomes, the more separation sensitive the synchronizing, signal separating circuit becomes. In other words, the resistance value of the bias resistor 11 larger than that of the bias resistor 10 causes the separation level to approach the lower end of the synchronizing signal. As a result, separation of the synchronizing signal becomes less susceptible to the video signal, thereby the separation sensitivity is improved. However, it is important not to allow the separation level to approach the lower end too much because the separation of the synchronizing signal is affected by noise included in the horizontal synchronization period in a weak electric field. In addition, increased gain of the inverter 12 causes the voltage V to be increased, whereby the amount of electric charge to be charged is also increased. This also enables the separation level to approach the lower end of the synchronizing signal so as to improve the separation sensitivity.

Figure 7:
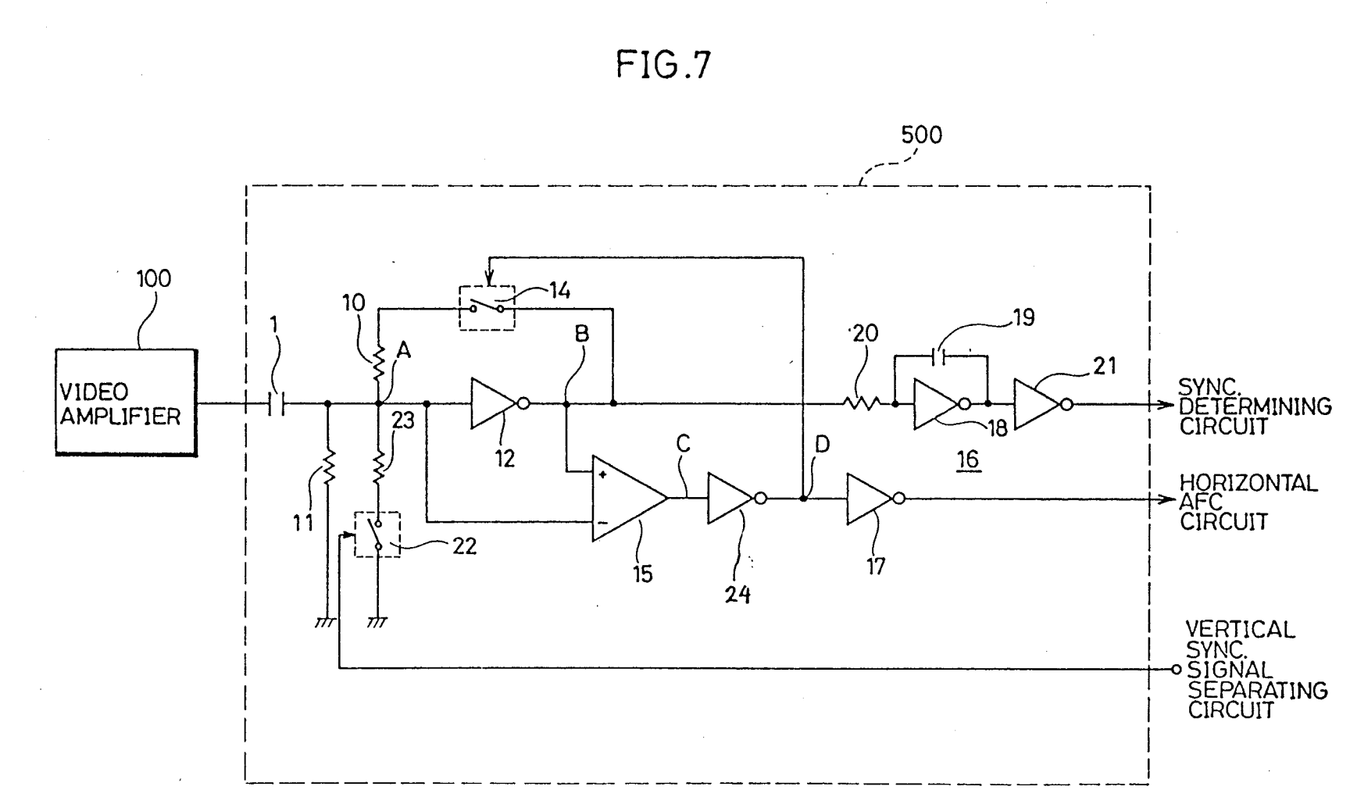
FIG. 7 is a circuit diagram showing a synchronizing signal separating circuit according to a second embodiment of the present invention.
Figure 8A:
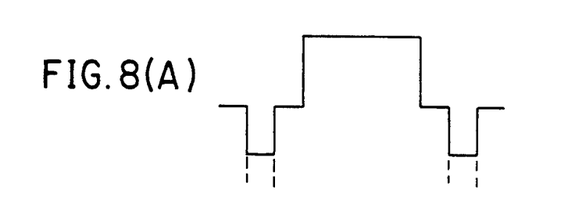
FIGS. 8a–8b are timing charts for explaining an operation of the embodiment shown in FIG. 7.
Figure 8B:
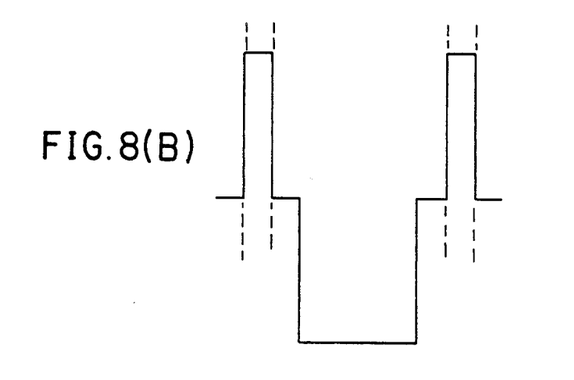
Figure 8C:
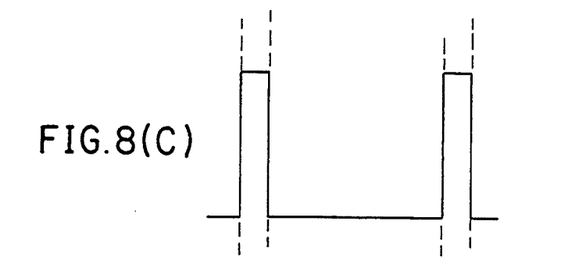
Figure 8D:
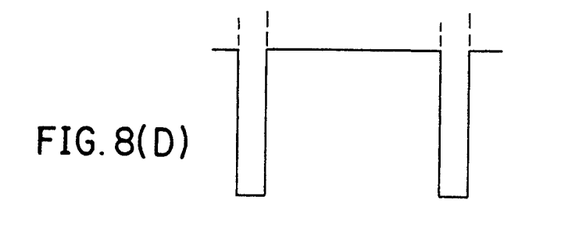

FIG. 7 is the circuit diagram showing the synchronizing signal separating circuit according to the second embodiment of the present invention. A basic configuration of the synchronizing signal separating circuit 500 shown in FIG. 7 is the same as that of the synchronizing signal separating circuit 400 according to the first embodiment shown in FIG. 4, except for the following points. Namely, a comparator 15 is provided in place of the inverter 13 for comparing the output and the input of the inverter 12; the output of the inverter 12 being taken out through separately provided low pass filter (LPF) 16 and inverter 21; and series-connected biased resistor 23 and switch 22 being provided between the node A and the ground in parallel with the bias resistor 11. The above described LPF 16 is comprised of an inverter 18, a condenser 19 and a resistor 20 and has an output supplied to a synchronization determining circuit (not shown) through the inverter 21. In addition, the output of the inverter 17 is supplied to a horizontal automatic frequency control (AFC) circuit for use as a chrominance signal processing circuit or the like. Switching of the switch 22 is controlled by a vertical equalizing pulse extracted in a vertical synchronizing signal separating circuit (not shown) provided in a stage subsequent to, for example, the synchronizing signal separating circuit. The inverters 24 and 17 may be suitably provided as required in order to obtain the synchronizing signal of the desired polarity.

FIG. 8 is a waveform diagram for explaining an operation of the synchronizing signal separating circuit 500 shown in FIG. 7, wherein FIGS. 8 (A), (B), (C) and (D) show signal waveforms in approxrmately one horizontal period at the corresponding nodes A, B, C and D in the circuit of FIG. 7, respectively.

First, when a composite video signal shown in FIG. 8 (A) is supplied to the input of the inverter 12 through the coupling condenser 1, the inverter 12 inverts and amplifies the signal to output such a signal, as shown in FIG. 8 (B), and then supplies the signal to a positive input of the comparator 15 and also to the input node A of the inverter 12 through the switch 14 and the bias resistor 10. In addition, the output of the inverter 12 is supplied also to the inverter 21 through the LPF 16. On the other hand, the signal of the node A (FIG. 8 (A)) is supplied to a negative input of the comparator 15 so that the comparator 15 outputs a horizontal synchronizing signal of the positive polarity shown in FIG. 8 (C) to the node C. The output of the comparator 15 is inverted and amplified by the inverter 13 to become a horizontal synchronizing signal of the negative polarity, as shown in FIG. 8 (D) and then, the signal is supplied to the control input of the switch 14 and also to, for example, a horizontal AFC circuit (not shown) through the inverter 17. Consequently, the switch 14 is a switch which is turned on when the control signal is at the "L" level and turned off when it is at the "H" level, as described above. Accordingly, in the horizontal synchronizing signal period (in the "L" level period of FIG. 8 (D), the switch 14 is turned on so that the coupling condenser 1 is charged by a potential of the node B through the bias resistor 10, and in another period other than the horizontal synchronizing signal period (in the "H" level period of FIG. 8 (D), the switch 14 is turned off, so that the charges stored in the coupling condenser 1 are discharged through the bias resistor 11. As a result, in the synchronizing signal separating circuit shown in FIG. 7, similar to the synchronizing signal separating circuit shown in FIG. 4, the direct current bias at the node A fluctuates in each horizontal period in response to an APL in the horizontal period so that the level difference between the top level of the horizontal synchronizing signal and the separation level is always maintained to a constant, thereby making a correct separation of the synchronizing signal possible.

In addition, the output of the inverter 12 (FIG. 8 (B)) is separately detected as a horizontal synchronizing signal through the LPF 16 and the inverter 21 functioning as a limiter, and supplied to, for example, a synchronization determining circuit. Such a function of the LPF 16 between the inverters 12 and 21 is intended for the improvement of separation sensitivity in a weak electric field. Generally, in the weak electric field, a synchronizing signal is covered with noise, and consequently if the synchronizing signal including such noise is directly supplied to a synchronization determining circuit in a succeeding stage, synchronization is erroneously determined to cause malfunction of a video apparatus. Therefore, by interposing the LPF 16 between the inverters 12 and 21, the noise component is removed to prevent the malfunction in the weak electric field.

Furthermore, in the embodiment of FIG. 7, in a vertical blanking period, the switch 22 is turned on by the vertical equalizing pulses extracted in the vertical synchronization separating circuit (not shown) in the succeeding stage. As a result, while the separation level goes away from the top level of the synchronizing signal to improve the separation sensitivity, there is no possibility of erroneous separation of the synchronization signal because no video signal exists in the vertical blanking period.

Figure 9:
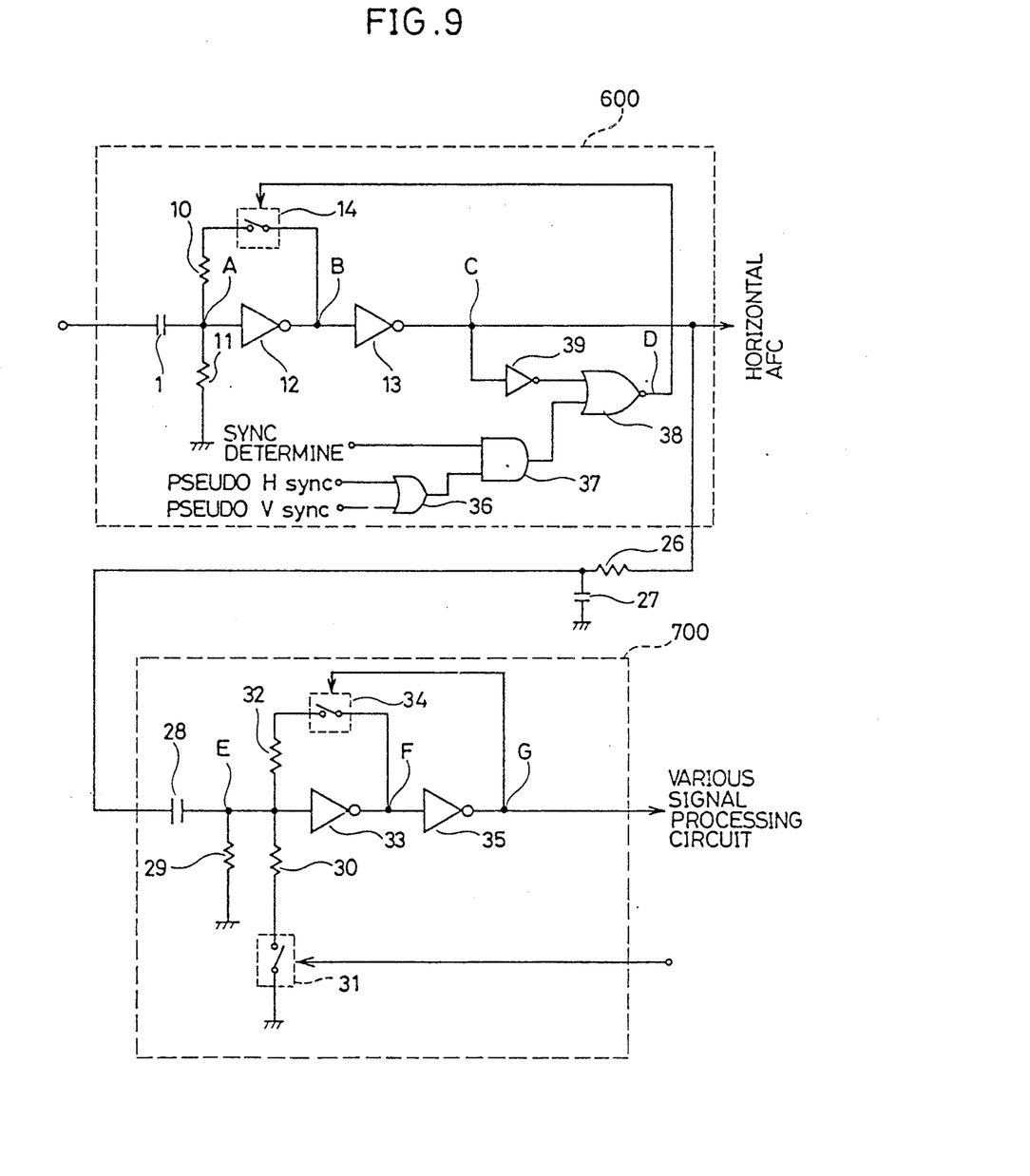
FIG. 9 is a circuit diagram showing a synchronizing signal separating circuit according to a third embodiment of the present invention.
Figure 10:
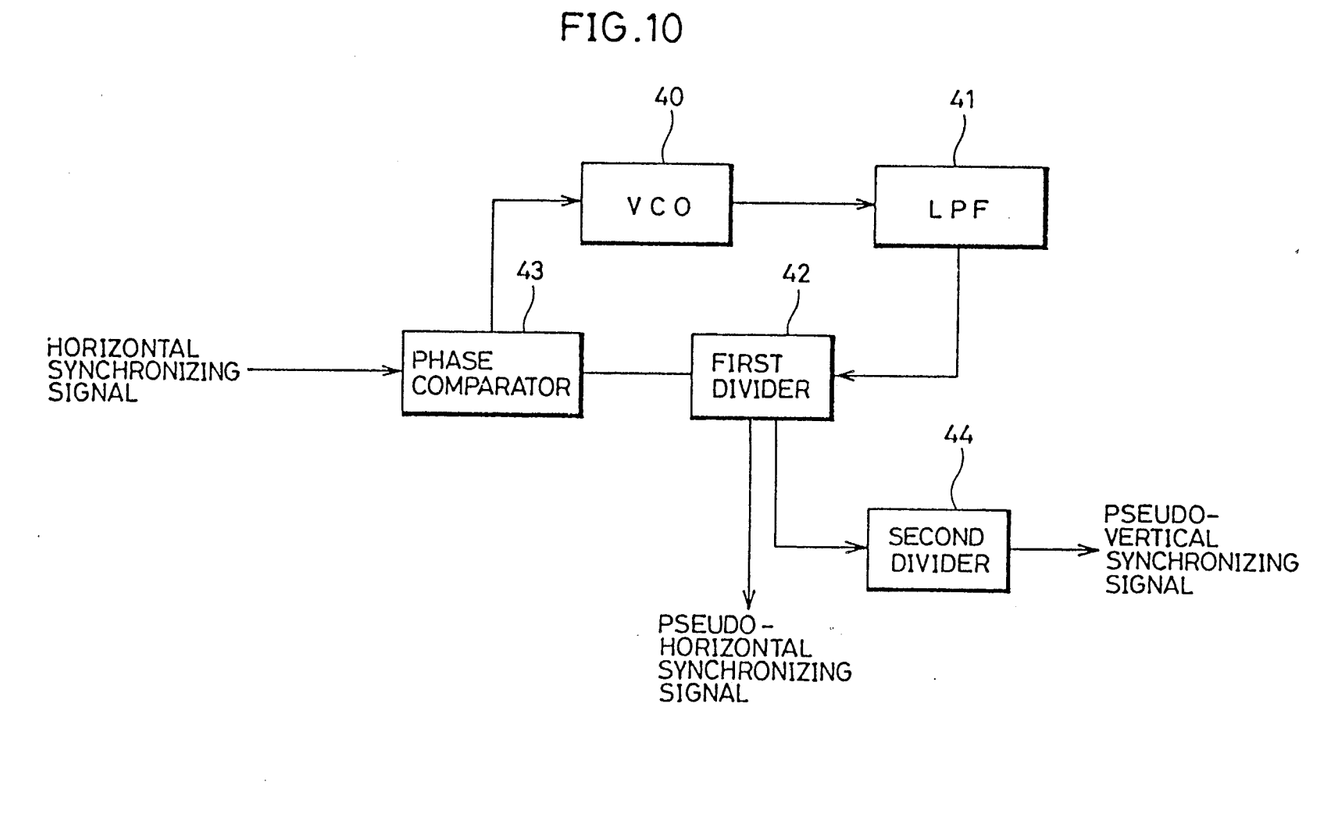
FIG. 10 is a schematic block diagram showing a horizontal AFC circuit.

FIG. 9 is a circuit diagram showing a synchronizing signal separating circuit according to a third embodiment of the present invention. Generally, the embodiment shown in FIG. 9 comprises a first synchronizing signal separating circuit 600 for receiving a composite video signal to separate a composite synchronizing signal including a horizontal synchronizing signal and a vertical synchronizing signal, and a second synchronizing signal separating circuit 700 for receiving the composite synchronizing signal to separate only the vertical synchronizing signal. The first and the second synchronizing signal separating circuits 600 and 700 have the same structure as that of the synchronizing signal separating circuit 400 according to the first embodiment shown in FIG. 4, except for the following points. Namely, the first synchronizing signal separating circuit 600 is provided with an OR gate 36 for receiving a pseudo-horizontal synchronizing signal and a pseudo-vertical synchronizing signal, an AND gate 37 for receiving an output of the OR gate 36 and a synchronizing determining signal, an inverter 39 for inverting the output of the inverter 13, and a NOR gate 38 for receiving an output of the AND gate 37 and an output of the inverter 39, wherein an output of the NOR gate 38 is supplied as a control input to the switch 14. The above described synchronization determining signal is a signal supplied from a synchronization determining circuit (not shown) which attains the "H" level in the synchronization period and attains the "L" in the non-synchronization period. In addition, the pseudo-horizontal synchronizing signal and the pseudo-vertical synchronizing signal are obtained by frequency-dividing an oscillating output of a voltage controlled oscillator (VCO) in a horizontal AFC circuit, and the pseudo-horizontal synchronizing signal is a signal which attains the "H" level during a period having a length approximately equal to that of the horizontal synchronization period and the pseudo-vertical synchronizing signal is a signal which attains the "H" level during a period having a length approximately equal to that of the vertical synchronization period. FIG. 10 is a block diagram showing the horizontal AFC circuit. Referring to FIG. 10, a VCO 40, an LPF 41, a first frequency divider 42 and a phase comparator circuit 43 constitute an AFC loop, wherein an oscillating output of the VCO 40 oscillating at a frequency of a predetermined multiple of a horizontal frequency $f_H$ is frequency-divided by a predetermined frequency-dividing ratio in the first frequency divider 42 through the LPF 41, and then supplied to one input of the phase comparator circuit 43. A horizontal synchronizing signal separated by the synchronizing separating circuit 600 of FIG. 9 is supplied to the other input of the phase comparator circuit 43, wherein phases of both signals are compared. Then, the phase comparator circuit 43 outputs an error output and supplies the same to the VCO 40 to adjust an oscillating period of the VCO, such that the horizontal synchronizing signal and the oscillating output of the VCO 40 have a predetermined phase relation. Now, an output of the first frequency divider 42 is taken out as a pseudo-horizontal synchronizing signal and supplied to the OR gate 36 of FIG. 9, and also supplied to the second frequency divider 44, which divider 44 frequency-divides the supplied pseudo-horizontal synchronizing signal to generate a pseudo-vertical synchronizing signal and supplies the same to the OR gate 36 of FIG. 9.

In reference back to the description of the first synchronizing signal separating circuit 600 of FIG. 9, the output of the inverter 13 is taken out as a composite synchronizing signal including a horizontal synchronizing signal and a vertical synchronizing signal, and then supplied to the horizontal AFC circuit of FIG. 10, and also integrated by an LPF including a resistor 26 and a condenser 27 and then supplied to the second synchronizing signal separating circuit 700.

While the second synchronizing signal separating circuit 700 basically has the same structure as that of the synchronizing signal separating circuit 400 of FIG. 4, it is provided with a series-connected bias resistor 30 and switch 31 arranged between an input node of an inverter 33 and a ground potential, in parallel with a bias resistor 29, similar to the synchronizing signal separating circuit 500 of FIG. 7. Similar to the embodiment of FIG. 7, switching of the switch 31 is controlled by vertical equalizing pulses. An output of the inverter 35 is supplied as a vertical synchronizing signal to various signal processing systems.

The following is a description of a reason for the provision of the OR gate 36, the AND gate 37, the inverter 39 and the NOR gate 38 in the first synchronizing signal separating circuit 600 of FIG. 9.

In the first and the second embodiments shown in FIGS. 4 and 7, as described above, even if a APL of a composite video signal fluctuates in each horizontal period, it is possible to correctly separate a synchronizing signal. However, since discharging of the coupling condenser 1 is performed in a period other than a synchronizing signal period, in case the APL abruptly changes during the period, a composite video signal having a different APL is inputted before the coupling condenser 1 is completely discharged so that a top level of the synchronizing signal fluctuates with respect to the separation level, whereby it becomes impossible to separate the synchronizing signal correctly. The first synchronizing signal separating circuit 600 of FIG. 9 is provided for resolving such problems, such that it is capable of correctly separating the synchronizing signal even if an APL fluctuates abruptly.

Figure 11:
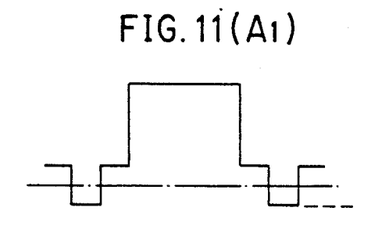

FIG. 11 is a waveform diagram for explaining an operation of the first synchronizing signal separating circuit 600 of FIG. 9, wherein FIGS. 11 (A$_1$) and (A$_2$) show signal waveforms at the node A and FIGS. 11 (B$_1$) and (B$_2$) show signal waveforms at the node B. First, when a composite video signal shown in FIG. 11 (A$_1$) is supplied to the input of the inverter 12 through the coupling condenser 1, the inverter 12 inverts and amplifies the signal to output a signal shown in FIG. 11 (B₁) and then supplies the same to the input of the inverter 13, and also supplies to the input node A of the inverter 12 through the switch 14 and the bias resistor 10. Similar to the embodiments of FIGS. 4 and 7, in the synchronizing signal period, the switch 14 is turned on so that the coupling condenser 1 is charged with the amount of the electric charge corresponding to a voltage V₁ of FIG. 11 (B₁).

Now, consider a case wherein a composite video signal having an APL which is approximately 100% is suddenly changed into a composite video signal having an APL which is approximately 0%, a composite video signal in the subsequent horizontal period is inputted to the coupling condenser 1 before the electric charge stored in the coupling condenser 1 are fully discharged so that the potential at the node A becomes as shown in FIG. 11 (A₂), and consequently the separation level (indicated by a dashed line) lowers below the lower end of the synchronizing signal. If such a signal is inverted and amplified by the inverter 12, the potential at the node B becomes as shown in FIG. 11 (B₂), whereby nd synchronizing signal is separated.

In the embodiment shown in FIG. 9, by employing a signal obtained by NOR processing, the pseudo-synchronizing signal generated based on the above described oscillating output of the VCO of FIG. 9 and the inverted output of the inverter 13 as a control signal of the switch 14, the switch 14 is turned on in a period which has a length approximately equal to that of the original synchronizing signal period even if no synchronizing signal is outputted from the inverter 13.

Figure 12A:
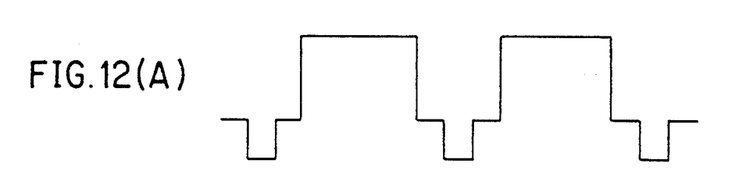
Figure 12B:
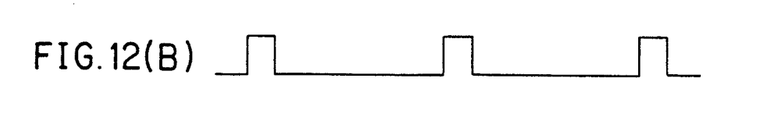

On the other hand, when the switch 14 is turned on by the pseudo-horizontal synchronizing signal in a state shown in FIGS. 11 (A₂) and (B₂), the amount of electric charges corresponding to the voltage V₂ are discharged from the coupling condenser 1. Since the resistance value of the bias resistor 10 is smaller than that of the bias resistor 11, this discharging is performed rapidly so that a relation between the separation level and the top level of the horizontal synchronizing signal is restored to a normal relation. As a result, separation of the horizontal synchronizing signal is correctly performed. FIG. 12 is a timing chart showing a relation between the original composite video signal (A) and the pseudo-horizontal synchronizing signal (B).

Furthermore, since in the first synchronizing signal separating circuit 600 of FIG. 9, the pseudo-vertical synchronizing signal is also NOR-processed with the inverted output of the inverter 13 and supplied to the switch 14 as a control input, the switch 14 is turned on during a period having a length approximately equal to that of the original vertical synchronizing signal period, so that the coupling condenser 1 is discharged to maintain the relation between the separation level and the top level of the synchronizing signal to be constant even in case a vertical synchronizing signal in a composite video signal largely fluctuates due to, for example, AG characteristics of a tuner, abnormal electric wave or the like. In other words, also with respect to the vertical synchronizing signal, a perfect separation of the synchronization can be performed similarly to the above described horizontal synchronizing signal. Then, the output of the inverter 13 is supplied as a composite synchronizing signal to the above described horizontal AFC circuit and is also integrated by the LPF comprising the resistor 26 and the condenser 27 and then supplied to the second synchronizing signal separating circuit 700.

FIG. 13 is a timing chart for explaining an operation of the second synchronizing signal separating circuit 700 of FIG. 9, wherein FIG. 13 (A) shows a signal waveform at the point C of FIG. 9; i.e., a composite synchronizing signal comprising a horizontal synchronizing signal and a vertical synchronizing signal separated by the first synchronizing signal separating circuit 600. Such a composite synchronizing signal passes through the LPF comprising the resistor 26 and the condenser 27 to become a signal of a waveform, as shown in FIG. 13 (B) at the point E of FIG. 9. This signal is inverted and amplified by the inverter 33 to become a signal of such waveform as shown in FIG. 13 (C) at the point F of FIG. 9. The signal is further inverted and amplified by the inverter 35, and at the point G of FIG. 9, only a vertical synchronizing signal is separated therefrom as shown in FIG. 13 (D) and is supplied to the various circuits (not shown).

Figure 13A:
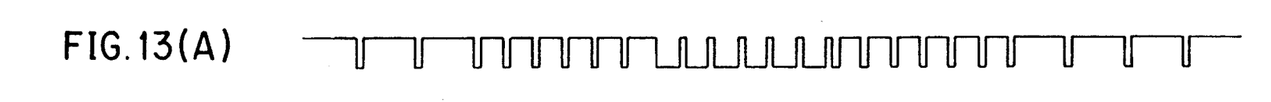
Figure 13B:
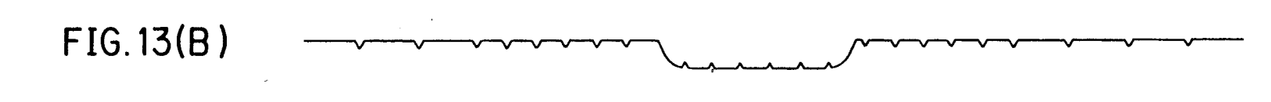
Figure 13C:
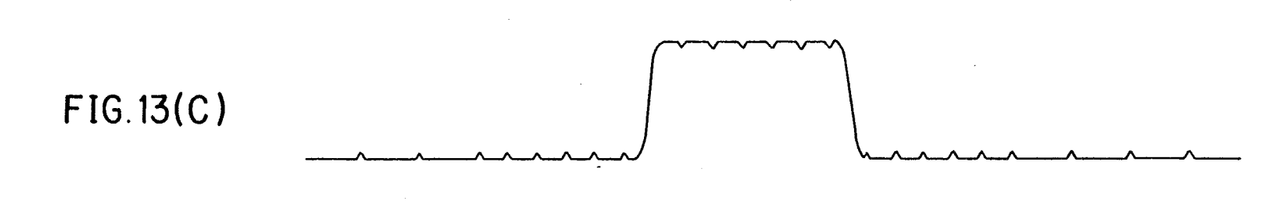
Figure 13D:
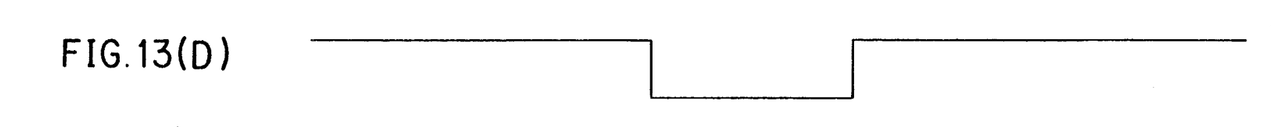

In addition, in the second synchronizing signal separating circuit 700 of FIG. 9, similar to the embodiment of FIG. 7, in the vertical synchronizing signal period, the switch 31 is turned on in response to vertical equalizing pulses, and the bias resistor 30 is connected between the node E and the ground. As a result, in the vertical synchronizing signal period, the separation level rises with respect to the top level of the vertical synchronizing signal of FIG. 13 (B) so that the influence of the small pulses included in the top level can be eliminated, whereby separation sensitivity during the vertical synchronizing signal period can be improved.

Figure 14:
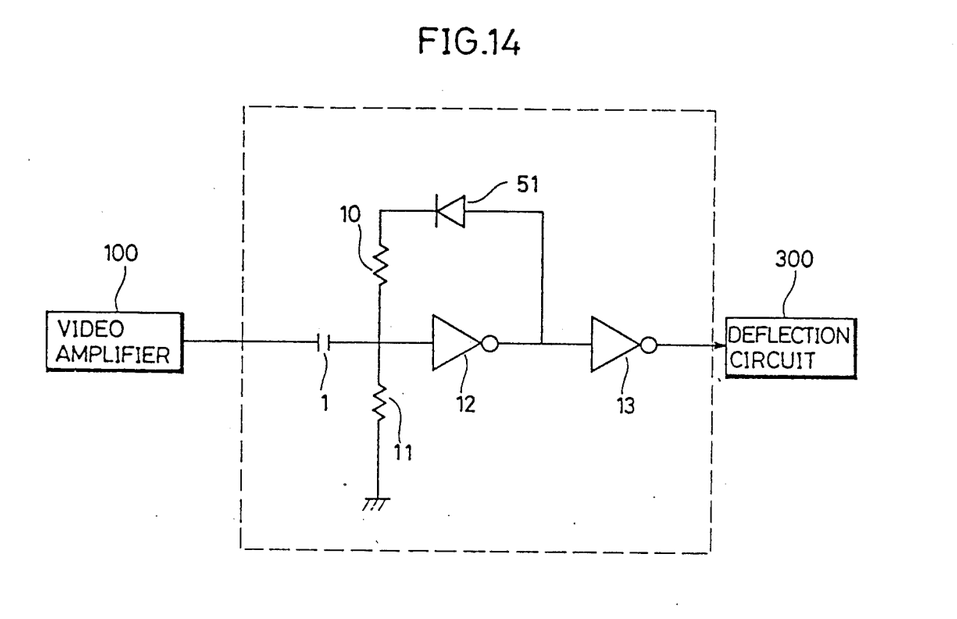
FIGS. 14 and 15 are circuit diagrams showing modified examples of the embodiment shown in FIG. 4.
Figure 15:
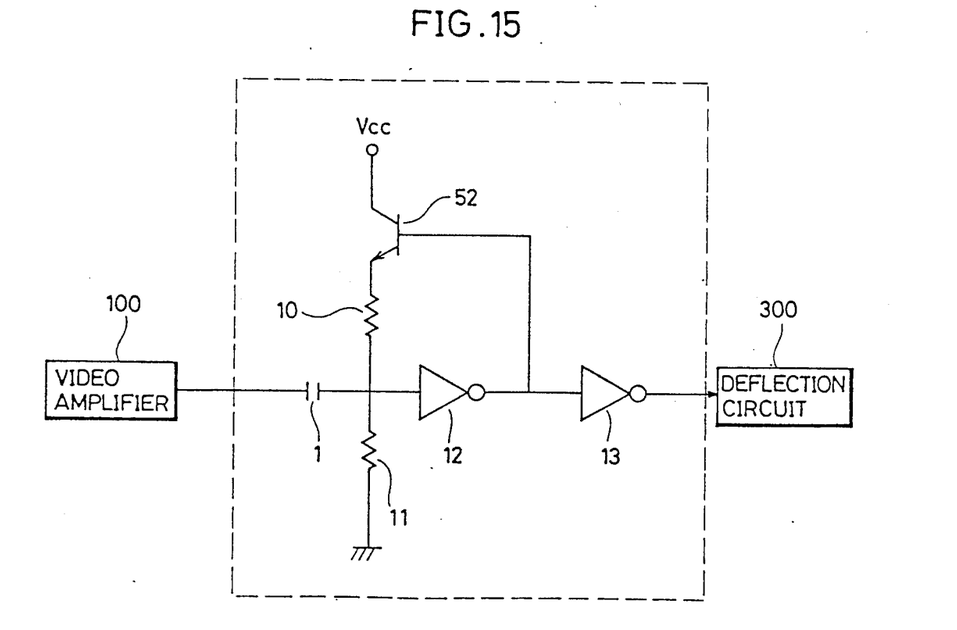

FIGS. 14 and 15 show modified examples of the embodiment shown in FIG. 4, wherein various types of electronic switches are employed as the switch 14. More specifically, FIG. 14 shows a case wherein a diode 51 is employed as the switch 14 of FIG. 4, and FIG. 15 shows a case wherein a transistor 52 is employed as the switch 14 of FIG. 4, and the same effect as that of the above described embodiment can be obtained in either case.

As to the foregoing, with respect to the embodiments of the present invention, even if a composite video signal having a different APL is inputted, and a level difference between a top level of a synchronizing signal and a separation level does not change, the synchronizing signal can be separated correctly.

Although the present invention has been described and illustrated in detail, it is clearly understood that the same is by way of illustration and example only, and is not to be taken by way of limitation; the spirit and scope of the present invention being limited only by the terms of the appended claims.

What is claimed is:

1. A synchronizing signal separating circuit for separating, from an input signal including at least a synchronizing signal, said synchronizing signal, comprising:
    coupling capacitance means (1) for receiving said input signal,
    first inverting and amplifying means (12) for inverting and amplifying said input signal received through said coupling capacitance means,
    first limiter means (13) for limiting an amplitude of an output signal of said first inverting and amplifying means to supply said output signal having its amplitude limited as said synchronizing signal,
    first bias means (10) for connecting an output node (B) to an input node (A) of said first inverting and amplifying means for charging said coupling capacitance means with the output signal of said first inverting and amplifying means, first switching means (14) provided between the output node of said first inverting and amplifying means and said first bias means and being controlled so as to be turned on in said synchronizing signal period in response to the output signal of said first limiter means and, second bias means connected between the input node of said first inverting and amplifying means and a fixed reference potential for discharging electric charges of said coupling capacitance means.

2. A synchronizing signal separating circuit according to claim 1, wherein said input signal is a composite video signal including horizontal and vertical synchronizing signals and a video signal, and said synchronizing signal supplied by said first limiter means is a composite synchronizing signal including horizontal and vertical synchronizing signals.

3. A synchronizing signal separating circuit according to claim 2, wherein said first limiter means includes second inverting and amplifying means (13) for further inverting and amplifying the output signal of said first inverting and amplifying means to supply the inverted and amplified signal as said composite synchronizing signal, wherein switching of said first switching means is controlled by the output signal of said second inverting and amplifying means.

4. A synchronizing signal separating circuit according to claim 2, which further comprises:

means (36, 37) for generating a pseudo-horizontal synchronizing signal and a pseudo-vertical synchronizing signal having lengths approximately equal to said horizontal and vertical synchronizing signals, respectively, means (38) for supplying said pseudo-horizontal synchronizing signal or said pseudo-vertical synchronizing signal as a control input of said first switching means, when said horizontal or vertical synchronizing signal is not supplied from said first limiter means.

5. A synchronizing signal separating circuit according to claim 1, wherein said input signal is a composite synchronizing signal including horizontal and vertical synchronizing signals, and said synchronizing signal supplied by said first limiter means is a vertical synchronizing signal.

6. A synchronizing signal separating circuit according to claim 5, wherein said first limiter means includes third inverting and amplifying means (35) for further inverting and amplifying the output signal of said first inverting and amplifying means to supply the inverted and amplified signal as said vertical synchronizing signal, wherein switching of said first switching means is controlled by the output signal of said third inverting and amplifying means.

7. A synchronizing signal separating circuit according to claim 5, further comprising means (26, 27) for integrating said input composite synchronizing signal.

8. A synchronizing signal separating circuit according to claim 5, which further comprises third bias means (30) and second switching means (31) connected in series between said input node (E) and the reference potential, in parallel with said second bias means (29), a switching of said second switching means being controlled so as to be turned on in the vertical synchronizing signal period.

9. A synchronizing signal separating circuit according to claim 1, wherein said first switching means comprises a diode (51).

10. A synchronizing signal separating circuit according to claim 1, wherein said first switching means comprises a transistor (52).

11. A synchronizing signal separating circuit for separating, from an input signal including at least a synchronizing signal, said synchronizing signal, comprising:

coupling capacitance means (1) for receiving said input signal, first inverting and amplifying means (12) for inverting and amplifying said input signal received through said coupling capacitance means, comparing means (15) for comparing input and output signals of said first inverting and amplifying means to supply the result of comparison as said synchronizing signal, first bias means (10) for connecting an output node (B) to an input node (A) of said first inverting and amplifying means for charging said coupling capacitance means with the output signal of said first inverting and amplifying means, first switching means (14) provided between the output node of said first inverting and amplifying means and said first bias means and being controlled so as to be turned on in said synchronizing signal period in response to the output signal of said comparing means and, second bias means (11) connected between the input node of said first inverting and amplifying means and a fixed reference potential for discharging electric charges of said coupling capacitance means.

12. A synchronizing signal separating circuit according to claim 11, which further comprises low-pass filter means (16) for cutting off a high frequency component of the output signal of said first inverting and amplifying means, and first limiter means (21) for limiting an amplitude of an output signal of said low-pass filter means to supply said output signal having its amplitude limited as said synchronizing signal.

13. A synchronizing signal separating circuit according to claim 11, wherein said input signal is a composite video signal including horizontal and vertical synchronizing signals and a video signal, and said synchronizing signal supplied by said comparing means is a composite synchronizing signal including horizontal and vertical synchronizing signals.

14. A synchronizing signal separating circuit according to claim 13, which further comprises third bias means (23) and second switching means (22) connected in series between said input node and said reference potential, in parallel with said second bias means (11), said second switching means being controlled so as to be turned on in the vertical synchronizing signal period.

* * * * *